April 10, 1962  R. D. GREEN  3,028,846
INTERNAL COMBUSTION ENGINE FUEL CHARGE FORMER
Filed Aug. 12, 1959

INVENTOR.
Royal D. Green
BY *Victor J. Evans & Co.*
ATTORNEYS ure Patent Office 3,028,846
Patented Apr. 10, 1962

3,028,846
INTERNAL COMBUSTION ENGINE FUEL CHARGE FORMER
Royal D. Green, 606½ N. Mount Vernon, Colton, Calif.
Filed Aug. 12, 1959, Ser. No. 833,293
5 Claims. (Cl. 123—25)

This invention relates to blending other liquids with gasoline as the gasoline is supplied as fuel to an internal combustion engine, and in particular this invention converts heavy liquids, such as water, gas, fuel oil, and the like, into hot gases of combustion wherein the water, gas, fuel oil and the like are supplied through a control valve so that such gases are supplied with precision.

The purpose of this invention is to provide and control a fuel that burns cleaner than conventional gasoline, produces more power, and produces less air polution by exhaust fumes.

Various attempts have been made to inject steam and water vapor and other products into fuel of internal combustion engines, however, the efficiency of the engine is reduced instead of being increased. With this thought in mind this invention contemplates precision mixing of other liquids such as water and fuel oil with fumes of gasoline and other fuels whereby the efficiency of an internal combustion engine is increased.

The object of this invention is, therefore, to provide a combination control and heating assembly whereby liquids, other than gasoline are vaporized and supplied to the intake manifold of an internal combustion engine through a precision actuated control valve.

Another object of the invention is to provide a fuel mixing assembly for internal combustion engines that blends other fuels with gasoline in which the assembly may be installed on internal combustion engines now in use without changing the fundamental elements of the engines.

A further object of the invention is to provide a precision fuel blending unit for introducing products into gasoline of internal combustion engines in which the unit is of a simple and economical construction.

With these and other objects and advantages in view the invention embodies an elongated tubular heater with a hot air tube extended from an exhaust manifold of an internal combustion engine through the heater, with a control needle valve for precision feeding of liquid to the heater, and with branch connections from the heater to inlet connections of an intake manifold.

Other features and advantages of the invention will appear from the following description taken in connection with the drawing, wherein.

Figure 1:
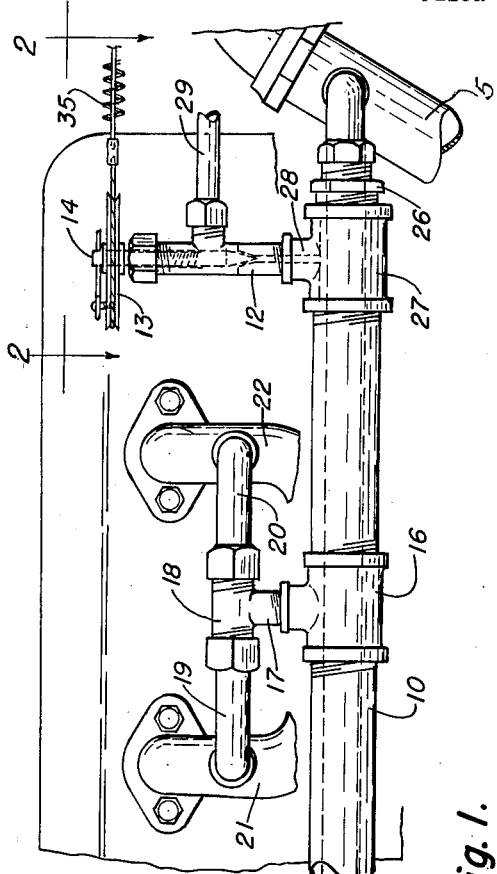
FIGURE 1 is a side elevational view of the upper portion of an internal combustion engine showing a fuel vaporizing heater with a control valve at one end and with branch connections to exhaust and intake manifolds.
Figure 2:
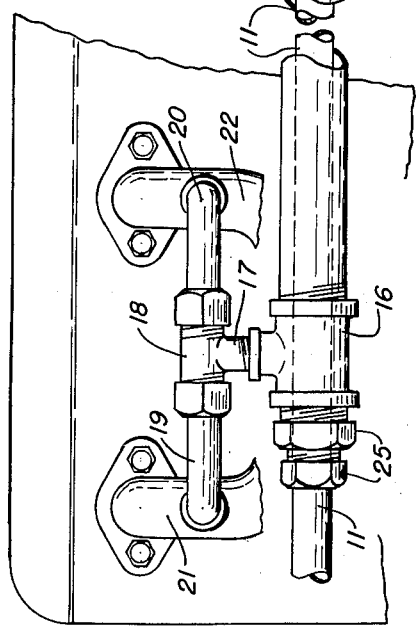
FIGURE 2 is a plan view of a manually actuated control disc for regulating the supply of fuel injected into the cylinder connection of an intake manifold.
Figure 2:
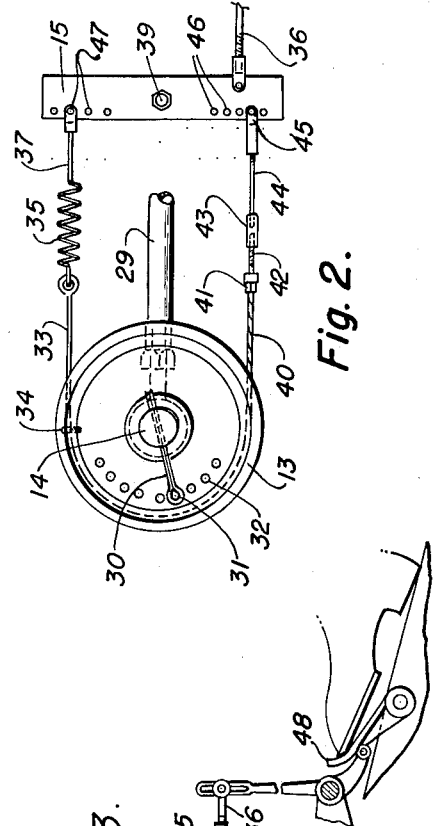

Referring now to the drawing wherein like reference characters denote corresponding parts the improved charge former of this invention includes a heater 10, an exhaust gas tube 11 extended from an exhaust manifold 5, through the heater and with the opposite end extended to an air filter and carburetor, a needle valve 12 having a V-belt pulley 13 mounted on a stem 14 extended upwardly from the valve, an equalizer 15 connected to the pulley through a spring and a turnbuckle and having a connection to a foot throttle, and T's 16 positioned at spaced intervals in the heater 10 and having branch connections 17 extended to fittings 18, from the ends of which tubes 19 and 20 extend to intake manifold connections 21 and 22.

The ends of the heater 10 are provided with compression or other type fittings 25 and 26 which seal the ends of the heater, and one end of the heater is provided with a T 27 having a branch connection 28 into which the lower end of the needle valve 12 is threaded. A supply connection 29 having a filter trap therein extends from the casing of the needle valve 12 to a supply of water, fuel oil, gas, or other products.

The supply of products is controlled by the needle valve with the pulley 13 on the upper end of the stem 14 connected to the stem by an arm 30, the extended end of which is connected by a screw 31 which extends through an eye of a cotter pin into the pulley 13. The pulley is provided with spaced threaded openings 32 for receiving the screw in the end of the arm and cotter pin. The spaced openings 32 are for the purpose of adjustment whereby the pulley 13 is maintained in such a position that the cable 33 is connected to the pulley by the screw 34 at a point not less than a 90 degree angle to a plane extended through the cable when the valve is closed. By this means sufficient leverage is provided to hold the valve 12 closed when the engine is idling or stationary. The cable 33 is connected to the pulley 13 by an eye bolt or screw 34 threaded in the pulley, and to a spring 35 which has sufficient tension to close the valve upon release of a cable 36, which extends from the equalizer bars 15 to the foot throttle of the vehicle.

The spring 35 is connected by a cable 37 to one of the plurality of openings 38 in one end of the equalizer bar 15, which is pivotally mounted on a pin 39; and a cable 40 extended around the outer portion of the pulley 13 and also connected to the screw 34 is connected by a coupling 41 to a threaded stud 42 of a turnbuckle 43 and the turnbuckle is connected by a cable 44 to one of a plurality of spaced openings 45 of the equalizer bar.

The equalizer bar is also provided with spaced openings 46 at one end and similar openings 47 at the opposite end and the cable 36, which extends to the accelerator pedal of a vehicle upon which the fuel charge former is mounted.

With the cables extended from the pulley 13 connected to the spaced openings 38 and 45 and with the cable 36 extended from the foot throttle or accelerator pedal attached in one of the openings 46 substantially any proportion of water in relation to gasoline or other fuel may be obtained.

As an illustration to use one gallon of water to twenty gallons of gasoline the connection of the turnbuckle to the equalizer bar should be moved one inch or from one of the openings 45 to the next opening, and to obtain the maximum proportion the turnbuckle connection is moved out to the last opening of the equalizer bar.

Figure 3:
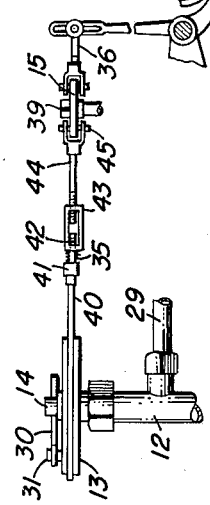
FIGURE 3 is an elevational view partly broken away showing the manner in which the foot throttle of an automobile is connected in unison with the charge forming unit embodying the invention.

With the cable 36 connected to the foot throttle 48 of the vehicle, as shown in FIG. 3, and with the parts accurately adjusted the supply of water, fuel oil, or other products to be blended with the gasoline is accurately controlled and substantially any mixture desired may be supplied to the intake manifold connections of the engine.

It will be understood that modifications, within the scope of the appended claims, may be made in the design and arrangement of the parts without departing from the spirit of the invention.

What is claimed is:
1. An internal combustion engine fuel blending unit comprising an elongated tube providing a heater, an ex- haust gas tube extended from an exhaust manifold of an engine through the tube forming the heater, a needle valve extended from the tube forming the heater, a product supply connection extended from the needle valve, a spring for operating the needle valve to a closed position, a connection to the needle valve for opening the needle valve against the action of the spring, and branch connections from the heater to connections of an intake manifold of the engine.

2. An internal combustion fuel blender comprising an elongated tubular heater, an exhaust gas tube extended through the heater, means for connecting one end of the exhaust gas tube to the exhaust manifold of an internal combustion engine, means for sealing ends of the heater around the exhaust gas tube, branch connections from the exhaust gas tube to intake manifold connections of an internal combustion engine to the exhaust manifold of which the exhaust gas tube is connected, a fuel supply connection extended from the heater and a foot throttle actuated valve in said fuel supply connection.

3. In a charge forming unit, the combination which comprises an elongated tube providing a heater, an exhaust gas tube extended through the heater, means for connecting one end of the exhaust gas tube to an exhaust manifold of an internal combustion engine, means for connecting the heater to connections of an intake manifold of the engine upon which the exhaust manifold is positioned, a needle valve positioned on one end of the heater, a fuel supply connection to said needle valve, a pulley mounted on the needle of the needle valve, a spring connected to one side of the pulley for closing the needle valve, and a cable extended from the side of the pulley opposite to the side to which the spring is connected for actuating the pulley to open the needle valve.

4. In a fuel charge forming unit for internal combustion engines, the combination which comprises an elongated tube providing a heater, branch connections from the tube to intake manifold connections of an engine, an exhaust gas tube extended from an exhaust manifold of the engine on which the intake manifold is positioned and extended through the tube providing the heater, means sealing ends of the heater around said exhaust gas tube, a needle valve mounted on one end of the heater, a fuel supply connection extended from the needle valve, said needle valve having a stem, a pulley mounted on the stem of the needle valve, an arm extended from the stem and positioned to be connected to the pulley at spaced points in an arch described from the center of the stem, a spring connected to one side of the pulley for urging the pulley to a position wherein the needle valve is closed, a cable extended from the pulley for actuating the pulley, and adjusting means in the cable extended from the pulley.

5. In a charge forming unit, the combination which comprises an elongated tube providing a heater, an exhaust gas tube extended through the heater, means for connecting one end of the exhaust gas tube to an exhaust manifold of an internal combustion engine, means for connecting the heater to connections of a intake manifold of an engine upon which the exhaust manifold is positioned, a needle valve positioned at one end of the heater, a water supply connection to said needle valve, a pulley mounted on the stem of the needle valve, an equalizer bar positioned in spaced relation to the pulley, said equalizer bar having spaced openings therein, a cable having a spring therein connecting one side of the equalizer bar to the pulley, a cable having a turnbuckle therein connecting the opposite side of the equalizer bar to the pulley, and a cable adjustably connected to the equalizer bar and extended for connection to a foot throttle for actuating the needle valve by said foot throttle.

References Cited in the file of this patent
UNITED STATES PATENTS

| | | |
|---|---|---|
| 1,060,042 | Wales | Apr. 29, 1913 |
| 1,147,608 | Clark | July 20, 1915 |
| 1,267,185 | Coffman | May 21, 1918 |
| 1,374,519 | Olson | Apr. 12, 1921 |
| 1,519,013 | Sipula | Dec. 9, 1924 |
| 1,547,985 | Wein | July 28, 1925 |
| 1,611,530 | Judia | Dec. 21, 1926 |
| 2,674,235 | Drydyke | Apr. 6, 1954 |